United States Patent
Singh et al.

(10) Patent No.: US 12,050,575 B2
(45) Date of Patent: Jul. 30, 2024

(54) MAPPING OF HETEROGENEOUS DATA AS MATCHING FIELDS

(71) Applicant: INTERNATIONAL BUSINESS MACHINES CORPORATION, Armonk, NY (US)

(72) Inventors: Neeraj Ramkrishna Singh, Bangalore (IN); James Albert O'Neill, Jr., Austin, TX (US); Soma Shekar Naganna, Bangalore (IN); Geetha Sravanthi Pulipaty, Bangalore (IN); Abhishek Seth, Deoband (IN)

(73) Assignee: International Business Machines Corporation, Armonk, NY (US)

(*) Notice: Subject to any disclaimer, the term of this patent is extended or adjusted under 35 U.S.C. 154(b) by 7 days.

(21) Appl. No.: 17/443,341

(22) Filed: Jul. 26, 2021

(65) Prior Publication Data
US 2023/0029643 A1   Feb. 2, 2023

(51) Int. Cl.
G06F 16/22 (2019.01)

(52) U.S. Cl.
CPC .................. G06F 16/2228 (2019.01)

(58) Field of Classification Search
CPC .................................................. G06F 16/2228
See application file for complete search history.

(56) References Cited

U.S. PATENT DOCUMENTS

| | | | | |
|---|---|---|---|---|
| 5,991,714 A | * | 11/1999 | Shaner | G06F 40/289 |
| | | | | 715/244 |
| 8,793,231 B2 | | 7/2014 | Cragun | |
| 9,031,895 B2 | | 5/2015 | Schon | |
| 9,928,233 B2 | * | 3/2018 | Young | G06Q 30/0282 |
| 10,956,986 B1 | * | 3/2021 | Ran | G06Q 40/12 |
| 2013/0226922 A1 | * | 8/2013 | Labenski | G06F 18/232 |
| | | | | 707/737 |
| 2016/0210523 A1 | * | 7/2016 | Abdollahian | G06V 10/75 |
| 2016/0342667 A1 | * | 11/2016 | Chen | G06F 16/2255 |
| 2017/0075898 A1 | | 3/2017 | Deshpande | |

OTHER PUBLICATIONS

Sifiso W. Ndlovu, "Dynamic column mapping in SSIS: SqlBulkCopy class vs Data Flow", Feb. 14, 2020, pp. 1-7, https://www.sqlshack.com/dynamic-column-mapping-in-ssis-sqlbulkcopy-class-vs-data-flow/ (Year: 2020).*

(Continued)

*Primary Examiner* — Allen S Lin
(74) *Attorney, Agent, or Firm* — Robert D. Bean

(57) ABSTRACT

A method, a structure, and a computer system for mapping data fields. The exemplary embodiments may include, based on determining that a first data set and a second data set contain homogenous data, mapping at least one column of the first data set to at least one column of the second data set based on comparing at least one of relative column position and unique value sets. Based on determining that the first data set and the second data set contain heterogeneous data, the exemplary embodiments may include mapping the at least one column of the first data set to the at least one column of the second data set based on a difference between distribution signatures of unique value sets within each of the first data set and the second data set being less than a threshold.

17 Claims, 5 Drawing Sheets

(56) References Cited

OTHER PUBLICATIONS

Courtney Roe, "A Guide to Metadata Mapping" Oct. 31, 2019, pp. 1-3, https://www.widen.com/blog/metadata-mapping (Year: 2019).*
Disclosed Anonymously, "Automated Metadata Harmonization Using AI", IP.com No. IPCOM000264386D, https://priorart.ip.com/IPCOM/000264386, Dec. 8, 2020, pp. 1-9.
IBM, "Adding Data and Mapping it to your Data Model", https://dataplatform.cloud.ibm.com/docs/content/wsj/mdm/onboard-data . . . , Jan. 4, 2021, pp. 1-4.
Jaiswal et al., "Schema matching and embedded value mapping for databases with opaque column names and mixed continuous and discrete-valued data fields", https://www.sqlshack.com/dynamic-column-mapping-in-ssis-sqlbulkcopy . . . ,Apr. 2013 Article No. 2 https://doi.org/10.1145/2445583.2445585, pp. 1-34.
Mell et al., "The NIST Definition of Cloud Computing", National Institute of Standards and Technology, Special Publication 800-145, Sep. 2011, pp. 1-7.
Ndlovu, "Dynamic column Mapping in SSIS: SqlBulkCopy Class vs Data Flow", https://www.sqlshack.com/dynamic-column-mapping-in-ssis-sqlbulkcopy . . . , Feb. 14, 2020, pp. 1-11.

\* cited by examiner

MAPPING OF HETEROGENEOUS DATA AS MATCHING FIELDS

BACKGROUND

The exemplary embodiments relate generally to data mapping, and more particularly to mapping heterogeneous data.

Master data management solutions involve matching and linking as one of its core capabilities. When match and link capabilities are needed for data coming from multiple sources, it is common to have variation in the metadata. Typically, the first step of matching and linking is mapping the source system columns to a common data model field, which renders them usable for the purpose of indexing and matching. This task, however, can be challenging when the contents of the original source have heterogenous content that, though may actually mean the same thing, are not similarly annotated. For example, a first source may use country codes while a second source may use country names. In another example, like products may have dissimilar descriptions based on location, e.g., writing pad vs notebook.

SUMMARY

The exemplary embodiments disclose a method, a structure, and a computer system for mapping heterogeneous data. The exemplary embodiments may include, based on determining that a first data set and a second data set contain homogenous data, mapping at least one column of the first data set to at least one column of the second data set based on comparing at least one of relative column position and unique value sets. Based on determining that the first data set and the second data set contain heterogeneous data, the exemplary embodiments may include mapping the at least one column of the first data set to the at least one column of the second data set based on a difference between distribution signatures of unique value sets within each of the first data set and the second data set being less than a threshold.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Master data management solutions involve matching and linking as one of its core capabilities. When match and link capabilities are needed for data coming from multiple sources, it is common to have variation in the metadata. Typically, the first step of matching and linking is mapping the source system columns to a common data model field, which renders them usable for the purpose of indexing and matching. This task, however, can be challenging when the contents of the original source have heterogenous content that, though may actually mean the same thing, are not similarly annotated. For example, a first source may use country codes while a second source may use country names. In another example, like products may have dissimilar descriptions based on location, e.g., writing pad vs notebook.

Figure 1:
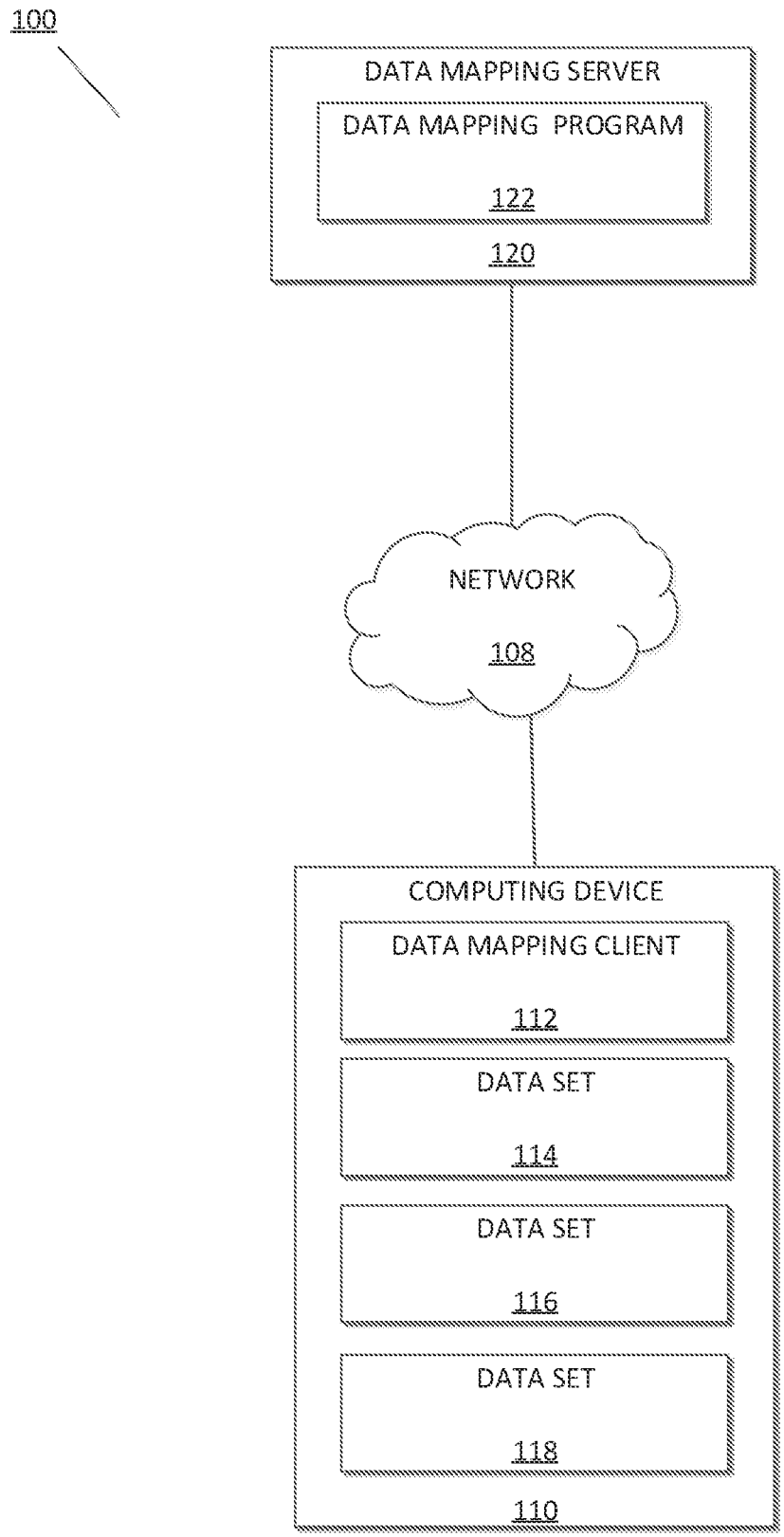
FIG. 1 depicts an exemplary schematic diagram of a data mapping system 100, in accordance with the exemplary embodiments.

FIG. 1 depicts the data mapping system 100, in accordance with exemplary embodiments. According to the exemplary embodiments, the data mapping system 100 may include a computing device 110 and a data mapping server 120, which all may be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc., which may be implemented as an intranet network, a local area network (LAN), a wide area network (WAN), or a combination thereof. In further embodiments, the network 108 may be a Bluetooth network, a Wi-Fi network, or a combination thereof. The network 108 may operate in frequencies including 2.4 GHz and 5 GHz internet, near-field communication, Z-Wave, Zigbee, etc. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In exemplary embodiments, the computing device 110 may include a data mapping client 112 and data sets 114, 116, and 118. The computing device 110 may be an enterprise server, a laptop computer, a notebook, a tablet computer, a netbook computer, a personal computer (PC), a desktop computer, a server, a personal digital assistant (PDA), a smart phone, a mobile phone, a virtual device, a thin client, an IoT device, or any other electronic device or computing system capable of sending and receiving data to and from other computing devices. While the computing device 110 is shown as a single device, in other embodiments, the computing device 110 may be comprised of a cluster or plurality of computing devices, in a modular manner, etc., working together or working independently. The computing device 110 is described in greater detail as a hardware implementation with reference to FIG. 3, as part of a cloud implementation with reference to FIG. 4, and/or as utilizing functional abstraction layers for processing with reference to FIG. 5.

In exemplary embodiments, the data mapping client 112 may act as a client in a client-server relationship with a server, for example the data mapping server 120, and may be a software and/or hardware application capable of communicating with and providing a user interface for a user to interact with a server and other computing devices via the network 108. Moreover, in the example embodiment, the data mapping client 112 may be capable of transferring data between the computing device 110 and other devices via the network 108. In embodiments, the data mapping client 112 may utilize various wired and wireless connection protocols for data transmission and exchange, including Bluetooth, 2.4 GHz and 5 GHz internet, near-field communication, etc. The data mapping client 112 is described in greater detail with respect to FIG. 2-5.

In exemplary embodiments, the data sets 114, 116, and 118 (hereinafter collectively referred to as "the data sets") may be a collection of data sourced from various sources in various formats. For example, the data sets may be formatted in .csv or .tsv formats. It will be appreciated that although only three data sets (the data sets 114, 116, and 118) are illustrated for brevity, the presently claimed invention is equally applicable to mapping any number of data sets. In embodiments, the data sets may be heterogeneous, meaning they exhibit variability in data types and values. The data sets are described in greater detail with respect to FIG. 2-5.

In exemplary embodiments, the data mapping server 120 includes a data mapping program 122, and may act as a server in a client-server relationship with a client, e.g., the data mapping client 112. The data mapping server 120 may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of sending and receiving data to and from other computing devices. While the data mapping server 120 is shown as a single device, in other embodiments, the data mapping server 120 may be comprised of a cluster or plurality of computing devices, in a modular manner, etc., working together or working independently. The data mapping server 120 is described in greater detail as a hardware implementation with reference to FIG. 3, as part of a cloud implementation with reference to FIG. 4, and/or as utilizing functional abstraction layers for processing with reference to FIG. 5.

In embodiments, the data mapping program 122 may be a software and/or hardware program that may determine whether the metadata of two data sets match and, if so, map the data sets. Alternatively, the data mapping program 122 may determine whether the data is homogeneous and, if so, map the data based on relative column position, transitivity, and/or unique value sets. Alternatively, the data mapping program 122 may obtain a unique value set for each of the data sets and differentiate generated distribution signatures thereof. The data mapping program 122 may further generate a frequency table of random sample sets from the distribution signatures and map the data based thereon. The data mapping program 122 is described in greater detail with reference to FIG. 2-5.

Figure 2:
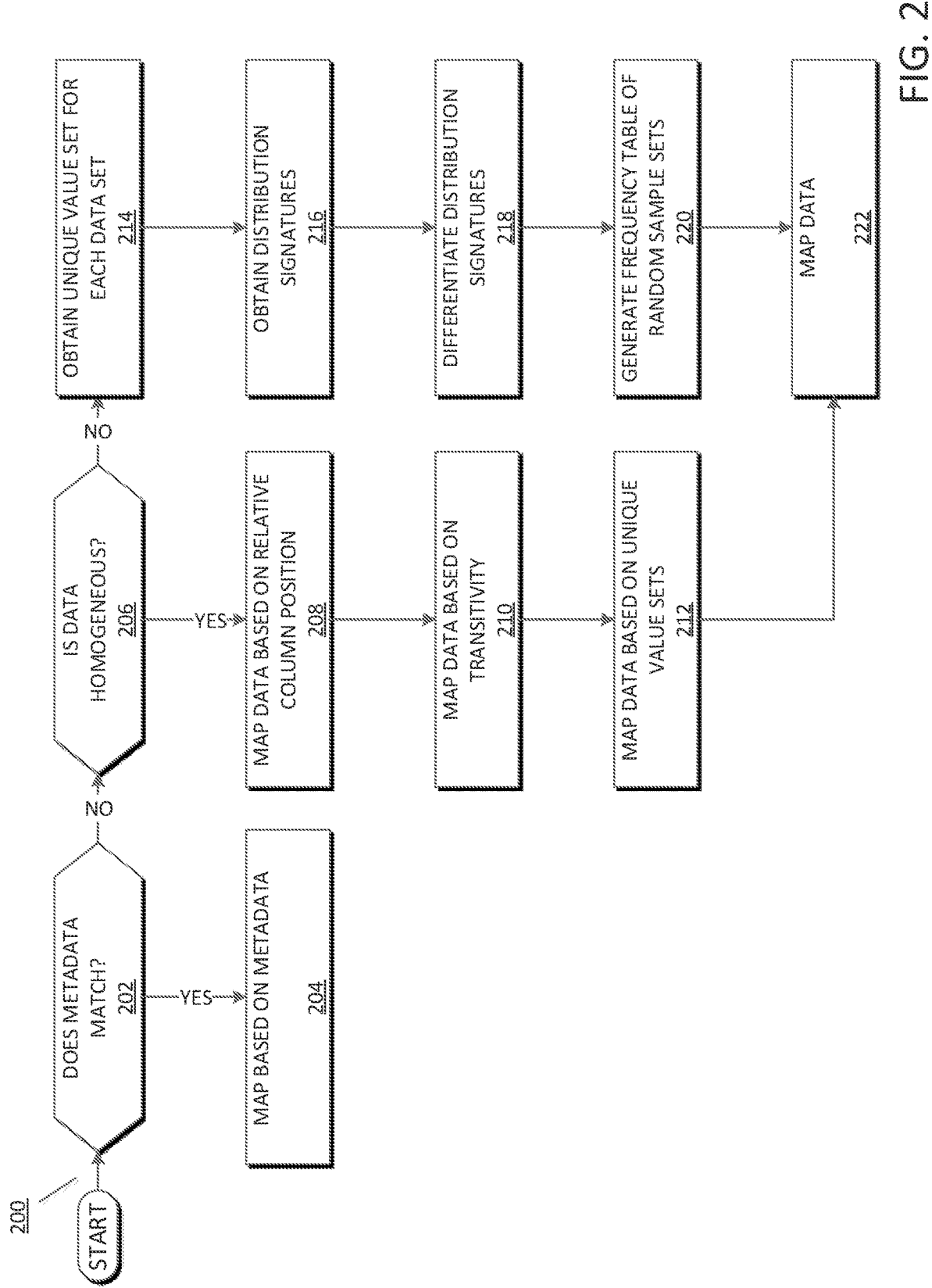
FIG. 2 depicts an exemplary flowchart 200 illustrating the operations of a data mapping program 122 of the data mapping system 100, in accordance with the exemplary embodiments.

FIG. 2 depicts an exemplary flowchart 200 illustrating the operations of the data mapping program 122 of the data mapping system 100, in accordance with the exemplary embodiments. In embodiments, the data sets to be mapped may include both data and metadata describing the data. For example, a data set may also include metadata indicating a type of data, e.g., entity name, address, phone number, etc., as well as the location of the data, e.g., column position. However, not all datasets include metadata describing the type or location of data within a data set, and furthermore even when they do they, may vary formats, units, nomenclatures, etc. Therefore, mapping data sets may not be as straight forward as simple matching.

In exemplary embodiments, the data mapping program 122 may first determine whether two or more data sets have matching metadata (decision 202). As previously described, the metadata may describe a type and location of the data within a data set, and matching metadata may be indicative of an equivalent data type suitable for mapping. The data mapping program 122 may determine whether metadata of two or more data sets match by determining whether they share any of the same column labels, common data field mappings, etc., either by exact matches or matching within a desired tolerance, e.g., using a distance/similarity metric. For example, Table 1 illustrates an example where metadata of the data sets 114 and 116 indicate they share the same column labels (i.e., A, B, C, etc.), e.g., using a common data model:

TABLE 1

| Data Set 114 | | | | | Data Set 116 | | | | |
|---|---|---|---|---|---|---|---|---|---|
| A | B | C | D | E | A | B | C | D | E |

As shown by Table 1, having like metadata is a simplest manner in which the data sets may be mapped. There may be instances in which part of the metadata is a match, e.g., data type may match while location may mismatch between the data sets. For example, Table 2 illustrates an example where data types match (i.e., A's, B's, C's, etc.) yet location is mismatched for data types B and C (i.e., one column off):

TABLE 2

| Data Set 114 | | | | | Data Set 116 | | | | |
|---|---|---|---|---|---|---|---|---|---|
| A | B | C | D | E | A | C | B | D | E |

In such an instance, the data mapping program 122 may match the data based on data type rather than location, i.e., B to B and C to C. Alternatively, there may be instances in which the data type may mismatch (or not be annotated) while the location appears correct (e.g., the data appears similar), which will be addressed in detail forthcoming.

If the data mapping program 122 determines that the metadata of the data sets match (decision 202, "YES" branch), the data mapping program 122 may map the column(s) of the first data set to the column(s) of the second data set having like metadata (step 204). In embodiments, the data mapping program 122 may map columns of one data set to those of another by associating all like columns with a unique identifier. In this way, the unique identifier may be used to reference all columns corresponding to the like data across all of the data sets. In other embodiments, the data mapping program 122 may combine the data sets, or use any other means of mapping the data sets together.

If the data mapping program 122 determines that the metadata does not match (decision 202, "NO" branch), then the data mapping program 122 may determine whether the data is homogeneous (decision 206). Homogeneous data may comprise data having a low variability of data types and values, while heterogeneous data may contain high variability of data types and data. In embodiments, the data mapping program 122 may determine whether the data sets are heterogeneous by comparing the data within the data sets, and more specifically by comparing the data formats and ranges. For example, the data mapping program 122 may identify and compare a format of the data, e.g., date (xx/xx/xxxx), time (xx:xx), unit (binary vs. continuous variable), etc., as well as the data values (e.g., exact, within ranges/tolerances, etc.). If the data is sufficiently similar, the data mapping program 122 identifies the data sets as having homogeneous data.

Based on determining that the data is homogeneous (decision 206, "YES" branch), then the data mapping program 122 may map the data based on relative column position (step 208). Mapping based on relative column position leverages the association a column may have with its surrounding columns. For example, data columns describing a name, address, and phone number are generally positioned within a few columns of, if not adjacent to, one another. The data mapping program 122 may leverage these associations when metadata describing one of such data columns is lacking. In the example depicted by Table 4, for instance, it is likely that column B corresponds to address based on the data type address commonly being positioned alongside name, phone number, date of birth, and email within a data set:

TABLE 4

| Data Set 114 | | | | |
|---|---|---|---|---|
| NAME | B | PHONE | DOB | EMAIL |

In embodiments, the data mapping program 122 may identify such data type position associations via receipt by user input, learning from user input, or machine learning techniques that identify data types typically associated with one another. The data mapping program 122 may further utilize the context of the data or a domain analysis to determine whether a data type is commonly associated with another data type positioned nearby within a data set. Based on these associations, the data mapping program 122 may identify one or more data types adjacent to and surrounding an unknown data type. The data mapping program 122 may then determine whether the identified, surrounding data types are commonly associated with the data type that is to be matched. In the example depicted by Table 5 below, for instance, the data mapping program 122 may determine that column C within the data set 116 is likely to correspond to phone number based on the columns relative position to other columns associated with phone number:

TABLE 5

| Data Set 114 | | | | | Data Set 116 | | | | |
|---|---|---|---|---|---|---|---|---|---|
| NAME | PHONE | ADDRESS | DOB | EMAIL | NAME | ADDRESS | C | DOB | EMAIL |

The data mapping program 122 may map the data based on transitivity (step 210). In embodiments having three or more data sets, the data mapping program 122 may determine a mapping between a first and second data set based on respective mappings to a third data set, thereby establishing an indirect mapping. For example, and illustrated by Table 6, if it is known that column B of the data set 116 maps to both column A of data set 114 and column C of the data set 118, then columns A and C may also be mapped:

TABLE 6

| Data Set 114 | Data Set 116 | Data Set 118 |
|---|---|---|
| A | B | C |

The data mapping program 122 may map the data sets based on unique values (step 212). Unique values may be described as the remaining values once all duplicates in each respective data set are removed, and as such may serve as a metric for comparing a similarity data sets. For example, and with reference to Table 7, the unique values of the data set 114 are A, B, and C (removing the duplicate A and B), while the unique values of the data set 116 are A, B, C, and D (removing the duplicate B):

TABLE 7

| Data Set 114 | | | | Data Set 116 | | | | |
|---|---|---|---|---|---|---|---|---|
| A | A | B | B | C | A | B | B | C | D |

In embodiments, the data mapping program 122 may plot the data in order to determine whether an intersection of the unique values within the two data sets, or columns thereof, is greater than a threshold percentage of the total. Based on determining that the intersection of unique values exceeds the threshold, the data mapping program 122 may infer that the columns are equivalent.

Based on the results of the relative column position, transitivity, and unique value analyses above, the data mapping program 122 may map the homogeneous data sets. When applicable, the data mapping program 122 may consider the results of all analyses and, if in conflict, may determine a final mapping based on various selection criteria or techniques. For example, the data mapping program 122 may select the results from an analyses having a highest confidence score, or go by a rule-based approach designating a prioritized analyses. Alternatively, the data mapping program 122 may balance confidences for a result with confidences against the result, then opt with the greater. The data mapping program 122 may additionally weight the techniques themselves based on accuracy and utilize machine learning techniques to finely tune such weights. In embodiments where the data mapping program 122 lacks the sufficient confidence to autonomously map the data, e.g., below a threshold confidence, user input may be solicited and recorded for input into such machine learning techniques. Future iterations may then learn from such user inputs.

If the data mapping program 122 determines that the data is not homogeneous (decision 206, "NO" branch), then the data mapping program 122 obtains a unique value set for each of the data sets (step 214). In embodiments where the data is found to be heterogeneous, the data mapping program 122 must determine both what columns of the data sets correspond to one another, as well as how to accurately convert the corresponding values thereof. In embodiments, the data mapping program 122 may begin the process by obtaining a unique value set for each of the data sets, or columns thereof, in a similar manner to that above. After obtaining a set of unique values for each of the data sets, the data mapping program 122 may then compare the number of unique values in each set to determine a similarity between the data sets. If the data sets exhibit too large a difference in an amount of unique values, the data sets are considered too different to be a match. For example, the data mapping program 122 may require a number of unique values in each data set be within a threshold percentage or threshold amount of each other.

The data mapping program 122 may obtain distribution signatures (step 216). In embodiments, the data mapping program 122 may obtain distribution signatures of the data sets, or columns thereof, by normalizing the frequency distribution in decreasing order.

The data mapping program 122 may differentiate the distribution signatures (step 218). In embodiments, the data mapping program 122 may differentiate the distribution signatures using any suitable methods, e.g., absolute distance, root mean square of percentage, etc. The data mapping program 122 may utilize the difference in distribution signatures as a metric for similarity between the two or more data sets, or columns thereof. In particular, the data mapping program 122 may ensure that the difference between the data sets is no more than a threshold percentage or amount. If the data mapping program 122 determines that the difference between the distribution signatures exceeds the threshold, the data mapping program 122 identifies the columns as too distinct and unsuitable for mapping. Alternatively, if the difference is less than the threshold, the data mapping program 122 may move on to normalizing the values of the mapped columns.

The data mapping program 122 may generate a frequency table of random sets sampled from each of the data sets (step 220). In embodiments, the data mapping program 122 may utilize the frequency table in order to convert the values between the data sets, or columns thereof, to be matched into a normalized and uniform format once mapped. In doing so, the data mapping program 122 may sample, e.g., one hundred, equal-sized random sample sets from both of the columns of the datasets, allowing for up to ten thousand comparisons. The data mapping program 122 may choose a subset N of these comparisons and, for each such comparison, plot a frequency based table that provides a mapping of values based on occurrences. For all N comparisons, the data mapping program 122 will plot mappings, and the mapping with the highest occurrences are considered as the final mapping or equivalent values. In case of inconclusive mappings, the data mapping program 122 may seek user or other third party feedback to confirm the equivalent values. Based on the similarities between the distribution signature used to identify equivalent columns above, as well as the frequency table to convert the values accordingly, the data mapping program 122 may map heterogeneous data sets.

Figure 3:
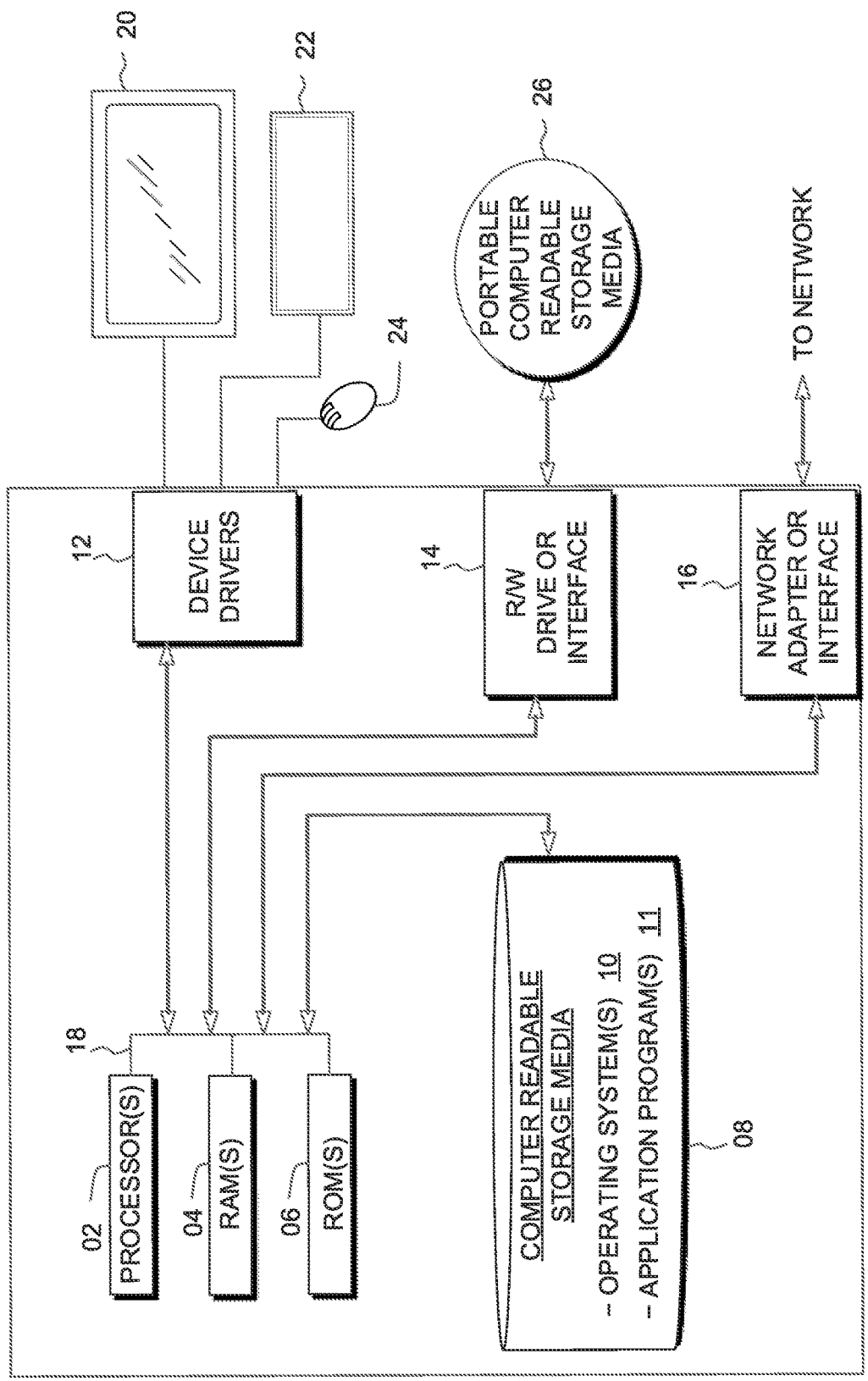
FIG. 3 depicts an exemplary block diagram depicting the hardware components of the data mapping system 100 of FIG. 1, in accordance with the exemplary embodiments.

FIG. 3 depicts a block diagram of devices used within the data mapping system 100 of FIG. 1, in accordance with the exemplary embodiments. It should be appreciated that FIG. 3 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
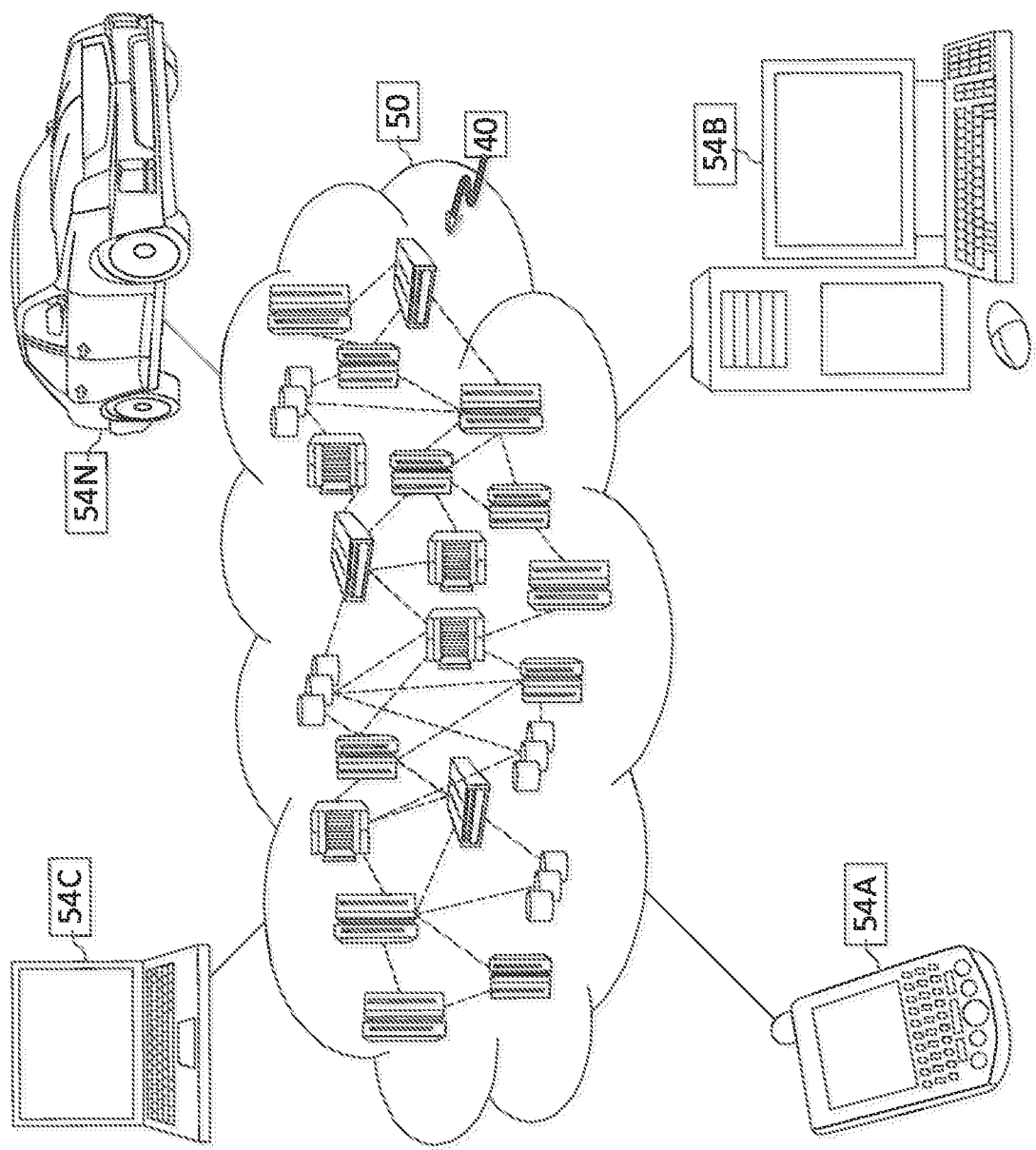
FIG. 4 depicts a cloud computing environment, in accordance with the exemplary embodiments.

Referring now to FIG. 4, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 40 and cloud computing environment 50 can communicate with any type of computerized device over any type of network and/or network addressable connection (e.g., using a web browser).

Figure 5:
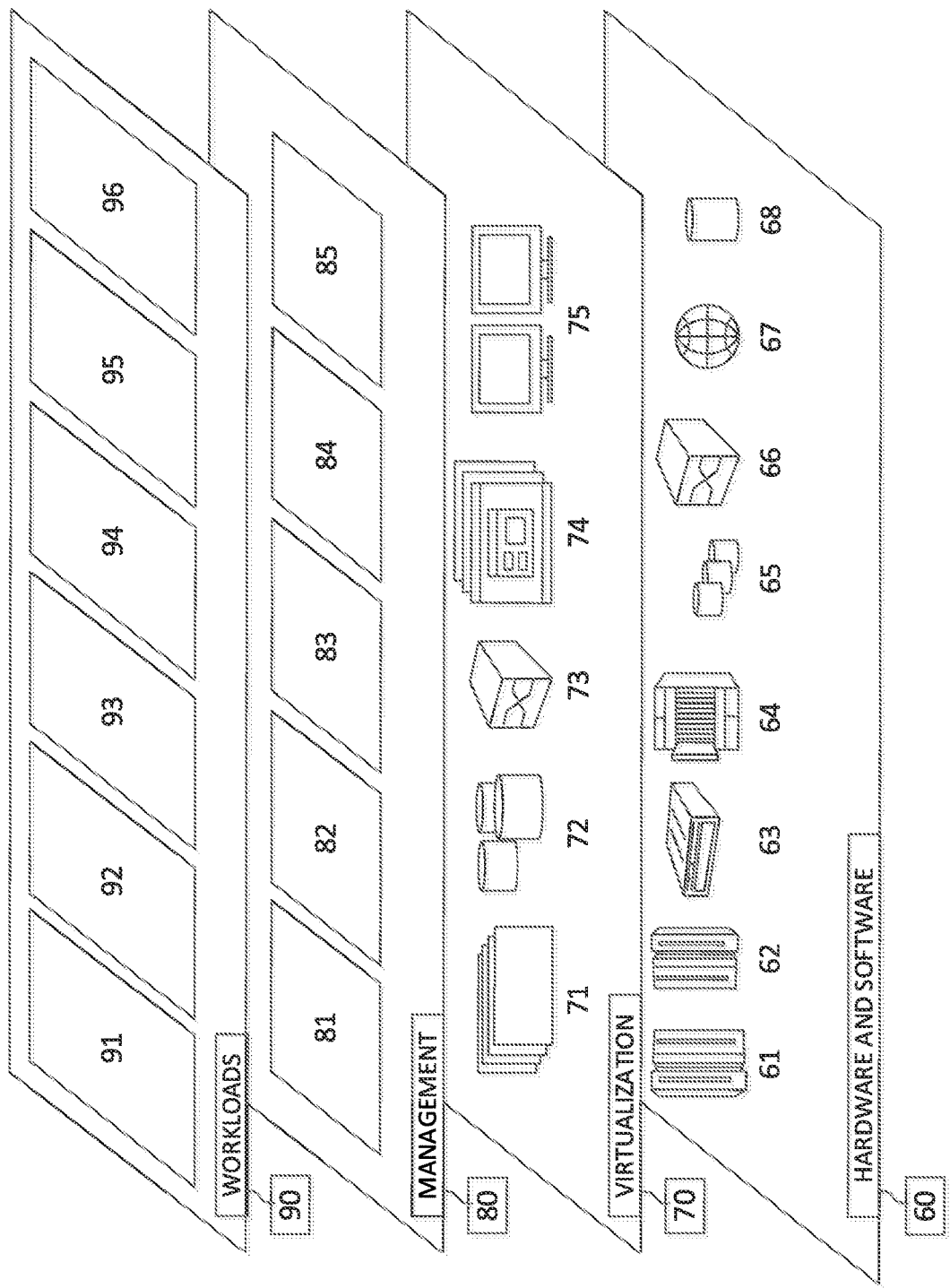
FIG. 5 depicts abstraction model layers, in accordance with the exemplary embodiments.

Referring now to FIG. 5, a set of functional abstraction layers provided by cloud computing environment 50 (FIG. 4) is shown. It should be understood in advance that the components, layers, and functions shown in FIG. 5 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data mapping processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for mapping data fields, the method comprising:
    receiving, by a data mapping program, one or more data files, each data file comprising metadata and one or more associated columns comprising one or more data sets;
    comparing a first metadata of at least one column of a first data set to a second metadata of at least one column of a second data set;
    responsive to the first metadata matching the second metadata of the second data set, mapping at least one column of the first data set to at least one column of the second data set;
    responsive to the first metadata failing to match the second metadata,
    comparing the first data set and the second data set to determine a similarity metric;
    responsive to the similarity metric exceeding a threshold value, determining that the data sets are homogeneous;
        responsive to determining that the data sets are homogeneous, mapping at least one column of the first data set to at least one column of the second data set based on relative column position or transitivity, wherein the mapping based on relative column position comprises identifying one or more associated data types that are determined to be located in adjacent columns to at least one column of the second data set; and
        determining that one or more data sets adjacent to the at least one column of the first data set comprise one or more of the associated data types;
    responsive to determining that the data sets are heterogeneous, identifying two or more matching columns of the first and second data sets by comparing distribution signatures of the first and second data sets or by comparing frequency tables of random sets sampled from the first and second data sets; and
    mapping the two or more matching columns from the first data set to the second data set.

2. The method of claim 1, wherein the identifying further comprises:
    identifying the sets of unique values as non-duplicate values within each of the first data set and the second data set; and
    determining that a number of unique values within each of the sets of unique values is within a threshold number of each other.

3. The method of claim 1, wherein the transitivity comprises:
    responsive to determining that a third data set additionally contains homogeneous data, and that a column of the third data set maps to both the at least one column of the first data set and the at least one column of the second data set, mapping the at least one column of the first data set to the at least one column of the second data set.

4. The method of claim 1, wherein the comparing frequency tables further comprises:
    identifying a unique value set for each of the first data set and the second data set;

generating a distribution signature of each of the unique value sets; and determining that a difference between the distribution signatures is less than a threshold.

5. The method of claim 1, wherein the relative column position further comprises:
identifying one or more commonly associated data types;
identifying an unknown data type and at least one of the one or more commonly associated data types within the second data set; and
determining whether the unknown data type is one of the remaining one or more commonly associated data types.

6. The method of claim 1, further comprising:
based on determining that the first data set and the second data set contain matching metadata, mapping the at least one column of the first data set to the at least one column of the second data set based on the matching metadata.

7. A computer program product for mapping data fields, the computer program product comprising a computer-readable tangible storage device having program code embodied therewith, the program code executable by a processor of a computer to perform a method, the method comprising:
receiving, by a data mapping program, one or more data files, each data file comprising metadata and one or more associated columns comprising one or more data sets;
comparing a first metadata of at least one column of a first data set to a second metadata of at least one column of a second data set;
responsive to the first metadata matching the second metadata of the second data set, mapping at least one column of the first data set to at least one column of the second data set;
responsive to the first metadata failing to match the second metadata,
comparing the first data set and the second data set to determine a similarity metric;
responsive to the similarity metric exceeding a threshold value, determining that the data sets are homogeneous;
responsive to determining that the data sets are homogeneous, mapping at least one column of the first data set to at least one column of the second data set based on relative column position or transitivity, wherein the mapping based on relative column position comprises identifying one or more associated data types that are determined to be located in adjacent columns to at least one column of the second data set; and
determining that one or more data sets adjacent to the at least one column of the first data set comprise one or more of the associated data types;
responsive to determining that the data sets are heterogeneous, identifying two or more matching columns of the first and second data sets by comparing distribution signatures of the first and second data sets or by comparing frequency tables of random sets sampled from the first and second data sets; and
mapping the two or more matching columns from the first data set to the second data set.

8. The computer program product of claim 7, wherein the identifying further comprises:
identifying the sets of unique values as non-duplicate values within each of the first data set and the second data set; and
determining that a number of unique values within each of the sets of unique values is within a threshold number of each other.

9. The computer program product of claim 7, wherein the transitivity comprises:
responsive to determining that a third data set additionally contains homogeneous data, and that a column of the third data set maps to both the at least one column of the first data set and the at least one column of the second data set, mapping the at least one column of the first data set to the at least one column of the second data set.

10. The computer program product of claim 7, wherein the comparing frequency tables further comprises:
identifying a unique value set for each of the first data set and the second data set;
generating a distribution signature of each of the unique value sets; and
determining that a difference between the distribution signatures is less than a threshold.

11. The computer program product of claim 7, wherein the relative column position further comprises:
identifying one or more commonly associated data types;
identifying an unknown data type and at least one of the one or more commonly associated data types within the second data set; and
determining whether the unknown data type is one of the remaining one or more commonly associated data types.

12. The computer program product of claim 7, further comprising:
based on determining that the first data set and the second data set contain matching metadata, mapping the at least one column of the first data set to the at least one column of the second data set based on the matching metadata.

13. A computer system for mapping data fields, the computer system comprising one or more computer devices each having one or more processors and one or more tangible storage devices; and
a program embodied on at least one of the one or more storage devices, the program having a plurality of program instructions for execution by the one or more processors, the program instructions comprising instructions for:
receiving, by a data mapping program, one or more data files, each data file comprising metadata and one or more associated columns comprising one or more data sets;
comparing a first metadata of at least one column of a first data set to a second metadata of at least one column of a second data set;
responsive to the first metadata matching the second metadata of the second data set, mapping at least one column of the first data set to at least one column of the second data set;
responsive to the first metadata failing to match the second metadata, comparing the first data set and the second data set to determine a similarity metric;
responsive to the similarity metric exceeding a threshold value, determining that the data sets are homogeneous;
responsive to determining that the data sets are homogeneous, mapping at least one column of the first data set to at least one column of the second data set based on relative column position or transitivity, wherein the mapping based on relative column position comprises identifying one or more associated data types that are determined to be located in adjacent columns to at least one column of the second data set; and determining that one or more data sets adjacent to the at least one column of the first data set comprise one or more of the associated data types;

responsive to determining that the data sets are heterogeneous, identifying two or more matching columns of the first and second data sets by comparing distribution signatures of the first and second data sets or by comparing frequency tables of random sets sampled from the first and second data sets; and mapping the two or more matching columns from the first data set to the second data set.

14. The computer system of claim 13, wherein the identifying further comprises:

identifying the sets of unique values as non-duplicate values within each of the first data set and the second data set; and determining that a number of unique values within each of the sets of unique values is within a threshold number of each other.

15. The computer system of claim 13, wherein the transitivity comprises:

responsive to determining that a third data set additionally contains homogeneous data, and that a column of the third data set maps to both the at least one column of the first data set and the at least one column of the second data set, mapping the at least one column of the first data set to the at least one column of the second data set.

16. The computer system of claim 13, wherein the comparing frequency tables further comprises:

identifying a unique value set for each of the first data set and the second data set;

generating a distribution signature of each of the unique value sets; and determining that a difference between the distribution signatures is less than a threshold.

17. The computer system of claim 13, wherein the relative column position further comprises:

identifying one or more commonly associated data types;

identifying an unknown data type and at least one of the one or more commonly associated data types within the second data set; and determining whether the unknown data type is one of the remaining one or more commonly associated data types.

* * * * *